United States Patent [19]

Yomoda

[11] Patent Number: 5,059,010
[45] Date of Patent: Oct. 22, 1991

[54] OPTICAL SYSTEM AND AN OPTICAL ATTACHMENT FOR A MICROSCOPE INCLUDING A FIELD LENS, A RELAY LENS, AND FOUR MIRRORS

[75] Inventor: Kazuo Yomoda, Kamisato, Japan

[73] Assignee: Nissho Optical Co., Ltd., Saitama, Japan

[21] Appl. No.: 569,482

[22] Filed: Aug. 20, 1990

Related U.S. Application Data

[63] Continuation of Ser. No. 417,414, Oct. 5, 1989, abandoned.

[30] Foreign Application Priority Data

Oct. 5, 1988 [JP] Japan ................ 63-251533

[51] Int. Cl.⁵ .......................................... G02B 21/18
[52] U.S. Cl. .................... 359/372; 359/434
[58] Field of Search .......... 350/511, 572, 574, 502, 350/526, 523, 507, 501, 506, 573

[56] References Cited

U.S. PATENT DOCUMENTS

| | | | |
|---|---|---|---|
| 1,458,143 | 6/1923 | Muller | 350/507 |
| 3,752,589 | 8/1973 | Kobayashi | 350/511 |
| 4,877,960 | 10/1989 | Messerschmidt et al. | 350/526 |

FOREIGN PATENT DOCUMENTS

| | | | |
|---|---|---|---|
| 159473 | 7/1957 | Sweden | 350/573 |
| 206856 | 12/1967 | U.S.S.R. | 350/501 |
| 2084755 | 4/1982 | United Kingdom | 350/507 |
| 2126746 | 3/1984 | United Kingdom | 350/572 |

OTHER PUBLICATIONS

R. N. Jackson et al., "Dual Microscope System", *IBM Tech. Dis. Bull.*, vol. 21, No. 8, Jan. 1979, pp. 3129–3130.

*Primary Examiner*—Jon W. Henry
*Attorney, Agent, or Firm*—Armstrong, Nikaido, Marmelstein, Kubovcik & Murray

[57] ABSTRACT

An optical attachment for a microscope which comprises a relay lens, a field lens, and at least four mirrors forming a square, closed optical path. The relay lens is set between the third mirror and the fourth mirror, the field lens between the first mirror and the second mirror, while the field lens is set on the image erected by the relay lens, the objective of the microscope is so set as to focus on the image erected by the field lens, and the first mirror is made replaceable outside of an optical path formed in front of the objective of the microscope.

2 Claims, 1 Drawing Sheet

5,059,010

OPTICAL SYSTEM AND AN OPTICAL ATTACHMENT FOR A MICROSCOPE INCLUDING A FIELD LENS, A RELAY LENS, AND FOUR MIRRORS

This application is a continuation of application Ser. No. 417,414 filed Oct. 5, 1989, now abandoned.

BACKGROUND OF THE INVENTION

1. Field of the Invention

The present invention relates to an optical system and an attachment to be equipped in front of the objective of a microscope designed for inspecting an object placed some distance from a microscope, and an optical attachment for a microscope with which the bottom and the side of an object can be inspected without replacing the object.

2. Prior art

With an existing microscope which consists of a pair of the objectives and a pair of the eyepieces, an object cannot be well inspected when placed too far from the microscope, and if replaced nearer by applying only a relay lens, the diameter of the relay lens is required to be so large that the same lens is found incovenient for an attachment for a microscope. Furthermore, with an existing microscope, nobody could inspect the bottom or other sides of an object set for inspection of the front thereof without replacing the object, in other words, one could in no way inspect any surface of an object which is different from the surface which is presently being inspected, without moving the object. No attachment has ever been made available for making such inspection feasible.

The present invention has in view to provide an optical realy system for a microscope that works with the aid of only a relay lens of small diameter, and a novel optical attachment for a microscope that makes possible inspection of various sides of an object without replacing the object.

SUMMARY OF THE INVENTION

An object of the present invention is to provide an optical system for a microscope in which a field lens is set on the image erected by a relay lens, and the objective of a microscope is so set as to focus on the image erected by the field lens.

Further object of the present invention is to provide an optical attachment for a microscope which comprises; a relay lens, a field lens and at least four mirrors forming a square; the first mirror being set on optical path between a microscope and an object and being so designed as to be replaceable outside of the optical path between the microscope and the object the relay lens being set between the third mirror and the fourth mirror; the field lens being set between the first mirror and the second mirror, and also being set on the image erected by the relay lens; the objective of the microscope being so set as to focus on the image erected by the field lens.

The optical attachment may further comprises a second relay lens (13) and a fifth mirror (12), the second relay rens (13) being set between the fifth mirror (12) and the object (11), the fifth mirror (12) being set at the intersection of the optical path between the second mirror 8 and the third mirror (9) and also being so designed as to be replaceable outside of an optical path between the second mirror (8) and the third mirror (9), the field lens (6) being set on the image erected by the second relay lens (13).

DETAILED DESCRIPTION AND THE PREFERRED EMBODIMENTS

The present invention is elucidated in detail according to the relevant drawings as follows; provided that it be by no means confined to these embodiments. Further, in each drawing illustrating an embodiment, the identical mark is provided for the identical component, respectively.

Figure 1:
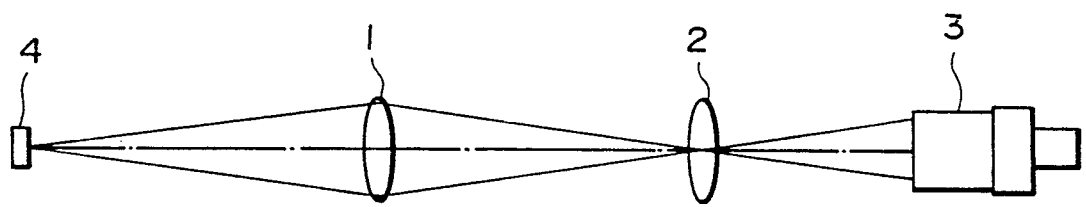
FIG. 1 illustrates the principle of an optical system for a microscope according to the present invention.

An optical system for a microscope as illustrated in FIG. 1 to which the present invention relates is designed to inspect an object 4 with the microscope by erecting the image of the object on a field lens 2 with the aid of a relay lens 1, as the said system is so constructed that the field lens 2 is set on the image erected by the relay lens 1, and the objective of the microscope (not illustrated) is set so as to focus on the image erected by the field lens 2.

If an object is inspected only by a relay lens without the aid of a field lens, it is generally required to make the diameter of the relay lens twice as large as the field of vision, affected by both the interior angle of a microscope and focal distance of the relay lens. The above-mentioned structure of the system according to the present invention is designed to provide a condition that a microscope can satisfactorily work with a relay lens of regular size, as both the angle of focal point formed by the field lens and the three-dimensional angle formed by the microscope cancel out each other, thus providing such a condition as the microscope can work with a lens of regular size; hence, the diameter of the relay lens can be so designed as only to cover the field of vision of the microscope, namely, a small diameter suffices.

Figure 2:
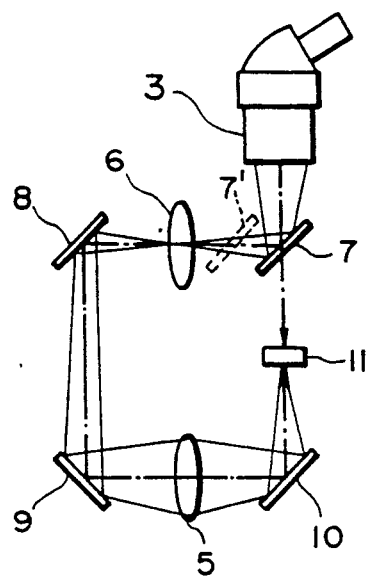
FIG. 2 illustrates the structure of an optical attachment for a microscope according to the present invention.

FIG. 2 illustrates one embodiment of an optical attachment for a microscope according to the present invention. This embodiment indicates that the objective of a microscope 3 is so set as to focus on the image erected by a field lens 6 utilizing a half-mirror 7 after setting the field lens on the image erected by a relay lens 5 passing through the third mirror 9 and the second mirror 8.

As the first mirror 7 in this embodiment can be replaced to the position marked 7' which does not interfere with an optical path between a microscope and an object 11, the top of the object 11 can be directly inspected by replacing the first mirror 7 to the position marked 7', while the bottom of the same object 11 can be inspected by returning the first mirror 7 to the position prior to replacement, and with the aid of a relay lens 5 and a field lens 6 together with the second mirror through the fourth mirror as numbered 8, 9 and 10, respectively.

Figure 3:
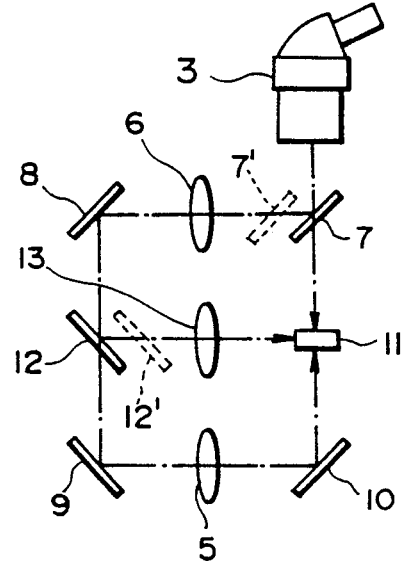
FIG. 3 illustrates an optical attachment for a microscope in another embodiment of the present invention.

The embodiment as indicated in FIG. 3 illustrates the way in which a closed optical path is formed, in the optical attachment for a microscope illustrated in FIG. 2, by the second relay lens 13, the fifth mirror 12, the second mirror 8 and the first mirror 12 in the same manner as such a closed optical path is formed by the second mirror 8, the third mirror 9, the fourth mirror 10, a relay lens 5, and a field lens 6 as well as the way in which the second relay lens 13 and the fifth mirror 12 are set at the side of an object 11, respectively.

When inspecting the top of an object 11 with the optical attachment for a microscope as illustrated in this embodiment, the first mirror 7 is replaced to the position marked 7' so that the top of the object can be directly inspected.

When inspecting the bottom of the object 11, it is possible to do so with the aid of the fourth mirror 10, the first relay lens 5, the third mirror 9, the second mirror 8 an the first mirror 7 after returning the first mirror 7 and the fifth mirror 12 back to their respective positions prior to replacement.

When inspecting the side of the object 11, inspection is so made with the aid of the second relay lens 13, the fifth mirror 12, the second mirror 8 and the first mirror 7 after returning the first mirror 7 and the fifth mirror 12 back to their respective positions prior to replacement.

With the optical attachment for a microscope according to the present invention, the top, the bottom and the side of an object can be inspected, respectively, without replacing the object, only by rearranging the components in the said attachment.

Further, the optical attachment for a microscope according to the present invention can be adapted to a monocular or binocular microscope as well as a binocular, three-dimensional microscope.

What is claimed is:

1. A microscope system comprising a microscope having an objective and an optical attachment in combination with said microscope, said optical attachment comprising:
    a relay lens (5);
    a field lens (6); and
    at least first through fourth mirrors forming a square, the first mirror (7) being disposed on an optical path between said microscope (3) and an object (11), said first mirror being displaceable to a position outside of the optical path between said microscope and the object, said relay lens being disposed between the third mirror (9) and the fourth mirror (10), said field lens being disposed between the first mirror (7) and the second mirror (8), said field lens further being set on an image erected by said relay lens, and wherein the objective of said microscope is set so as to focus on an image erected by said field lens.

2. A microscope system as set forth in claim 1, wherein said optical attachment further comprises a second relay lens (13) and a fifth mirror (12), said second relay lens being disposed between said fifth mirror and said object, said fifth mirror being disposed at an intersection of an optical path between said second mirror and said third mirror, said fifth mirror further being displaceable to a position outside of said optical path between said second mirror and said third mirror, and wherein said field lens is set on an image erected by said second relay lens.

* * * * *